US012630408B2

(12) United States Patent
Dahan et al.

(10) Patent No.: US 12,630,408 B2
(45) Date of Patent: May 19, 2026

(54) LIQUID DISPENSER APPARATUS

(71) Applicant: UNITO SMART TECHNOLOGIES LIMITED, Tsuen Wan NT (HK)

(72) Inventors: Avi Dahan, Rishon Lezion (IL); Yoni Dahan, Rishon Lezion (IL)

(73) Assignee: UNITO SMART TECHNOLOGIES LIMITED, Tsuen Wan NT (HK)

( * ) Notice: Subject to any disclaimer, the term of this patent is extended or adjusted under 35 U.S.C. 154(b) by 77 days.

(21) Appl. No.: 18/420,011

(22) Filed: Jan. 23, 2024

(65) Prior Publication Data

US 2024/0246807 A1 Jul. 25, 2024

(30) Foreign Application Priority Data

Jan. 25, 2023 (EP) .................................... 23153289

(51) Int. Cl.
*B67D 1/08* (2006.01)
*B67D 1/00* (2006.01)

(52) U.S. Cl.
CPC ......... *B67D 1/0888* (2013.01); *B67D 1/0004* (2013.01); *B67D 2001/0811* (2013.01)

(58) Field of Classification Search
CPC ................ B67D 1/0888; B67D 1/0004; B67D 2001/0811; B67D 1/004; B67D 1/0041; B67D 1/0078; B67D 1/0059
See application file for complete search history.

(56) References Cited

U.S. PATENT DOCUMENTS 9,394,154 B2 * 7/2016 Connerat ............. B65D 77/065
10,399,841 B2 9/2019 Metropulos et al.
10,850,966 B2 12/2020 Lahey et al.
10,858,232 B2 12/2020 Carpenter et al.
(Continued)

FOREIGN PATENT DOCUMENTS

WO 2011011690 A1 1/2011
WO 2015148509 A1 10/2015
(Continued)

OTHER PUBLICATIONS

European Patent Application No. EP23153289, European Search Report mailed Jul. 11, 2023, 2 pages.

*Primary Examiner* — Donnell A Long
(74) *Attorney, Agent, or Firm* — Kilpatrick Townsend & Stockton LLP

(57) ABSTRACT

The invention refers to a liquid dispenser apparatus including a liquid inlet connected to a liquid source, a dispensing outlet connected to a liquid dispensing unit, a conduit arrangement, an additive storage receiving unit having a plurality of additive storage receiving slots, wherein each additive receiving slot is designed to receive an additive storage having an additive storage identifier for identifying a predetermined content of additive liquid contained in the respective additive storage, a control unit having a memory for storing a respective additive storage identifier for each additive storage receiving slot, and a user interface for receiving an additive liquid selection command by the user, and where the control unit is configured to control the additive storage receiving unit to select a respective additive storage receiving slot and to put the respective additive storage in fluid communication with the conduit arrangement.

14 Claims, 9 Drawing Sheets

(56) References Cited

U.S. PATENT DOCUMENTS

| | | | | |
|---|---|---|---|---|
| 2006/0021919 | A1* | 2/2006 | Olson | B01F 35/213 210/85 |
| 2017/0101302 | A1 | 4/2017 | Quartarone et al. | |
| 2019/0300357 | A1* | 10/2019 | Crawford | G07F 13/065 |
| 2023/0119340 | A1* | 4/2023 | Carson | B67D 1/0036 222/1 |

FOREIGN PATENT DOCUMENTS

| | | | |
|---|---|---|---|
| WO | 2015148710 | A1 | 10/2015 |
| WO | 2018125957 | A1 | 7/2018 |
| WO | 2018140546 | A1 | 8/2018 |

* cited by examiner

LIQUID DISPENSER APPARATUS

CROSS REFERENCE TO RELATED APPLICATION

This application claims priority to European Patent Application No. 23 153 289.6, filed in Europe on Jan. 25, 2023, the entire contents of which are hereby incorporated herein by this reference.

DESCRIPTION

The present invention refers to a liquid dispenser apparatus.

Liquid dispenser apparatuses are generally known and are often used for dispensing treated or non-treated liquids, such as filtered or non-filtered hot or cold water or beverages, in particular in conjunction with household applications, such as faucets of kitchens or the like. However, already at this point it should be noted that although the present invention is described below in part with reference to the dispensing of water and beverages via faucets of kitchens, no limitations of the invention can be derived therefrom.

In particular, for preparing flavored beverages other than pure water, such liquid dispenser apparatuses often comprise an additive storage receiving unit having a plurality of additive storage receiving slots, wherein each additive storage receiving slot is designed and intended to receive an additive storage configured to contain an additive liquid, such as a flavored syrup or the like. In this context, it is common that the additive storages are configured to be received in the additive storage receiving slots according to a predetermined order so that each additive storage receiving slot is associated with a fixed type of additive storage containing a predetermined content of additive liquid corresponding to a predetermined flavor, for example. As a result, in a case of replacing empty additive storages with full additive storages, the user is required to consider that each receiving slot is intended to receive one single predetermined additive storage having one single predetermined flavor. Thus, for example, if the user unintentionally interchanges the predetermined order of additive storages in one or more additive storage receiving slots, a case may occur, in which a user selects a predetermined content of additive liquid corresponding to a predetermined flavor, for example via a user interface of the liquid dispenser apparatus, wherein, due to the interchanged order of additive storages in the additive storage receiving slots, the liquid dispenser apparatus, however, dispenses another content of additive liquid corresponding to another predetermined flavor.

Furthermore, due to the fixed association between additive liquids and additive storage receiving slots, the number of different contents of additive liquids and thus, the number of different flavors is usually limited to the number of available additive storage receiving slots. As a result, the variety of beverages that may be prepared with known liquid dispenser apparatuses is often very low which may be not satisfactory for the user.

It is therefore an object of the present invention to provide a liquid dispenser apparatus which is capable to overcome those situations and to counter at least some of the above-mentioned drawbacks.

According to the present invention this object is solved by a liquid dispenser apparatus, comprising a liquid inlet which is designed and intended to be connected to a liquid source and to receive a base liquid from the liquid source, a dispensing outlet which is designed and intended to be connected to a liquid dispensing unit, in particular a faucet, a conduit arrangement which is configured to put at least the liquid inlet and the dispensing outlet into fluid communication with each other, an additive storage receiving unit having a plurality of additive storage receiving slots, wherein each additive storage receiving slot is designed and intended to receive an additive storage configured to contain an additive liquid and to dispense the additive liquid into the conduit arrangement, each additive storage having an additive storage identifier for identifying a predetermined content of additive liquid contained in the respective additive storage, a control unit which is operatively connected to the additive storage receiving unit, the control unit having a memory which is configured to store a respective additive storage identifier for each additive storage receiving slot to associate each predetermined content of additive liquid with a respective additive storage receiving slot, and a user interface which is operatively connected to the control unit and configured to be operated by a user, wherein the user interface is configured to receive an additive liquid selection command by the user corresponding to a respective predetermined content of additive liquid, wherein, based on the additive liquid selection command, the control unit is configured to control the additive storage receiving unit to select a respective additive storage receiving slot and to put the respective additive storage in fluid communication with the conduit arrangement.

According to the invention, the control unit has the memory, such as a read-write memory, in which each additive storage receiving slot is associated with a predetermined content of additive liquid. If the user selects a predetermined content of additive liquid corresponding to a particular flavor, for example, the liquid dispenser apparatus according to the invention ensures that the control unit is configured to control the additive storage receiving unit to select the correct additive storage receiving slot and to put the respective additive storage in fluid communication with the conduit arrangement, even if the order of additive storages in one or more additive storage receiving slots may be changed during replacement of one or more of the additive storages.

In addition, as the number of different contents of additive liquids and thus, the number of different flavors, is no longer limited to the number of available additive storage receiving slots, it is possible to use an almost unlimited number of different flavors in one and the same liquid dispenser apparatus. In other words, each additive storage receiving slot may be associated with any type of additive liquid.

In principle, the user may manually input via the user interface which additive storage, in particular which predetermined content of additive liquid, is received in which additive storage receiving slot. Thus, the user interface may be configured to receive additive storage identifier data which are to be manually input by a user, and to transmit the additive storage identifier data to the control unit, the additive storage identifier data indicating a respective additive storage, in particular a predetermined content of additive liquid, which is received in a corresponding additive storage receiving slot, and to receive additive storage receiving slot data which are to be manually input by a user and to transmit the additive storage receiving slot data to the control unit, the additive storage receiving slot data indicating the corresponding additive storage receiving slot in which the respective additive storage is received. Thus, in other words, the user interface may be further configured to receive manual input by the user defining a loaded additive storage receiving slot and manual input by the user defining the additive storage which is received in the loaded additive storage receiving slot. The additive storage identifier data and/or the additive storage receiving slot data may be input via the user interface itself and/or a mobile terminal, such as smartphone or a smartwatch or the like, for example.

However, to make the process of associating each additive storage receiving slot with a respective additive storage even more comfortable, according to an embodiment of the invention, the liquid dispenser apparatus may further comprise a detecting unit having at least one signal output which is connected to a signal input of the control unit and configured to, in particular automatically, detect the additive storage identifier of a respective additive storage and/or the additive storage receiving slot in which the respective additive storage is received or is intended to be received. The connection between the signal output and the signal input may be implemented by wire or wireless. Furthermore, the detection unit may be configured to automatically detect the additive storage identifier of a respective additive storage when inserting the additive storage in a respective additive storage slot.

In further development of the latter embodiment, to further ensure simple and reliable detection of the additive storages and/or the additive storage receiving slots in which a respective additive storage is received, the detecting unit may comprise an optical reader, in particular a barcode reader and/or a camera, and/or a magnetic reader, in particular a RFID reader. In addition or as an alternative, the additive storage identifier may comprise an optical identifier, in particular a barcode and/or a QR-code and/or a label, and/or a magnetic identifier, in particular a RFID identifier. In this context, the additive storage identifier may be printed or fixed, in particular adhered, to an outer surface of the respective additive storage, for example.

Furthermore, to be capable of detecting which additive storage, in particular which predetermined content of additive liquid, is received in which additive storage receiving slot, directly in the liquid dispenser apparatus, in particular after the additive storages have been inserted in respective additive storage receiving slots, the detecting unit may be configured to be arranged on or adjacent to the additive storage receiving unit. As an alternative, the detecting unit may be also configured as a mobile detecting unit, in particular a mobile terminal, such as smartphone or a smartwatch, if it is preferred to be also able to detect the additive storage identifier of a respective additive storage prior to inserting the additive storages in the respective additive storage receiving slots. However, it is understood that even with the mobile detecting unit, the additive storage identifiers may be detected with the additive storages already being inserted in the respective additive storage receiving slots.

For inputting the above mentioned additive liquid selection command, the user interface may comprise an electronic knob and/or a touch panel or the like, which is preferably arranged on or adjacent to the liquid dispensing unit. If it is preferred to also display predetermined information to the user, such as the selection of available flavors corresponding to the predetermined content in the loaded additive storages, the user interface, in addition or as an alternative, may comprise a touch screen, which is likewise preferably arranged on or adjacent to the liquid dispensing unit.

Furthermore, the user interface may be operated by a user for dispensing the base liquid, such as filtered cold or hot water, and/or the additive liquid and/or the base liquid and the additive liquid at substantially the same time for producing a mixture of the latter, via the liquid dispensing unit.

In principle, the base liquid and the additive liquid may be configured to be mixed at any suitable point within the conduit arrangement of the liquid dispenser apparatus. However, if a mixture of base liquid and additive liquid as well as pure water pass through a same conduit of the conduit arrangement, residuals of an additive liquid may influence the flavor of a pure base liquid, such as water, subsequently dispensed through the same conduit. Thus, to ensure mixing of base liquid and additive liquid preferably only at an outlet of the liquid dispensing unit, in particular of the faucet, the additive storage receiving unit may be configured to dispense the additive liquid into an additive conduit of the conduit arrangement which is fluidically connected to the liquid dispensing unit, wherein preferably the additive conduit is fluidically separated from other conduits of the conduit arrangement which are directly connected to the liquid dispensing unit.

Also, in some cases, residues of one predetermined additive liquid present in the conduit arrangement or the additive storage receiving unit may be mixed with another predetermined additive liquid that may be subsequently dispensed through the additive storage receiving unit and/or the conduit arrangement. This may lead to undesired cross-contamination of different additive liquids and thus, to undesired influence on the taste of beverages to be prepared with the liquid dispenser apparatus. To solve this issue, according to a further embodiment, the conduit arrangement may further comprise a flushing conduit which is configured to receive the base liquid on its one end and to supply the base liquid to the additive storage receiving unit and/or the additive conduit via its other end.

In principle, the liquid additive contained in the additive storages may be dispensed into the conduit arrangement, in particular the additive conduit, via the effect of gravity or the like. However, to ensure that the liquid additive may be dispensed always very precisely and reliably, the liquid dispenser apparatus may further comprise at least one pump unit, in particular at least one pump unit for each additive receiving slot, wherein the at least one pump unit may be configured to be fluidically connected to a respective additive storage to dispense the additive liquid into the conduit arrangement, in particular the additive conduit.

To remove residues of liquid additive out of the conduit arrangement, in particular the additive conduit, for preventing the above mentioned cross-contamination of different additive liquids or the like, the at least one pump unit may be configured as a bidirectional pump unit, which may be configured to be operated in a pump mode in which it is configured to pump additive liquid into the conduit arrangement, in particular the additive conduit, and a suction mode in which it is configured to draw additive liquid out of the conduit arrangement, in particular the additive conduit.

To enable that the additive liquid may be dispensed out of a respective additive storage irrespective of a fill level of the additive storage, each additive storage may be formed as a flexible additive storage so that flexible storage walls of the additive storage may collapse in response to dispensing liquid additive out of the additive storage substantially without air accumulating in the additive storage.

According to a preferred embodiment, each additive storage may be formed as a semi-flexible additive storage, in particular as a pouch having a self-supporting and dimensionally stable structure with flexible collapsible pouch walls. Thus, the pouch walls may be configured to collapse during draining the liquid additive out of the additive storage, while the dimensionally stable structure is configured to remain straight, so that a height of the additive storage is substantially constant irrespective of the fill level of the additive storage which allows smooth draining of the additive liquid.

As an alternative, each additive storage may be formed as an additive storage having a substantially box-shaped rigid outer structure with a pouch having flexible collapsible pouch walls received in the substantially box-shaped rigid outer structure, which may correspond to the so called bag-in-box structure.

To enable easy and comfortable insertion of an additive storage in the respective additive storage receiving slot, at least one, in particular each, additive storage receiving slot of the plurality of additive storage receiving slots may comprise a sliding unit which is configured to be, preferably linearly, translatable between a first position, in which an additive storage is insertable into and/or removable from the respective additive storage receiving slot, and a second position in which the sliding unit is configured to engage a spout of the respective additive storage in a fluid tight manner.

Furthermore, for the same reason, the additive storage receiving unit may be configured to be movable by a pivoting movement between a maintenance position in which the additive storages are insertable into and/or removable from the respective additive storage receiving slot with spouts of the additive storages facing in an substantially upward direction, and an operating position in which the additive storage receiving unit along with the additive storages are pivoted such that the spouts of the additive storages face in a substantially downward direction.

To ensure that the additive storage receiving unit may be pivoted into the operating position only after the sliding unit has been engaged with the spout of the respective additive storage in a fluid tight manner, the additive storage receiving unit may configured such that the pivoting movement from the maintenance position into the operating position is prevented, if the sliding unit is in the first position.

As an alternative, the additive storage receiving unit may be configured without the function of the above pivoting movement, wherein the additive storages may be inserted into and/or removed from the respective additive storage receiving slot with the spouts of the additive storages face in a substantially downward direction. In such a case, to prevent unintentional draining of additive liquid out of the spout when inserting an additive storage into the respective additive storage receiving slot, the spout of the additive storage may be configured such that it may be penetrated by a corresponding penetration element formed on each additive storage receiving slot to release the liquid additive only after the additive storage has been inserted.

According to a further embodiment, for storing and/or treating liquid originating from the liquid source, which may be a mains water supply or the like, the liquid dispenser apparatus may also comprise at least one first base liquid storage configured to store a first base liquid, in particular cold and/or carbonized water, and/or at least one second base liquid storage configured to store a second base liquid, in particular hot and/or boiling water, wherein the first and/or the second liquid storage may be fluidically connected to the conduit arrangement. In such a case, a valve arrangement of the liquid dispenser apparatus may be configured to control flow of liquid into and/or out of the first and/or second base liquid storage in and/or out of the conduit arrangement. The valve arrangement may comprise one or more solenoid valves and/or one or more check valves and/or one or more pressure relief valves and/or one or more of any mechanical or electromechanical parts.

According to the latter embodiment, the liquid dispenser apparatus may also comprise cooling device which is configured to cool liquid in the first base liquid storage and/or heating device, such as a resistive heating element, configured to heat liquid in the second base liquid storage.

The liquid dispenser apparatus may further comprise a heating device, such as water heater or a boiler, for heating liquid supplied by the liquid source and supplying it to the liquid dispensing unit, in particular the faucet, via the conduit arrangement. Furthermore, the liquid dispenser apparatus may comprise a mixing device which is arranged on or adjacent the liquid dispensing unit and configured to adapt a mixing ratio between liquid heated by the heating device of the liquid dispenser and non-heated liquid, such as cold line water, supplied from the liquid source which mixing ratio is to be dispensed via the liquid dispensing unit, in particular the faucet.

If the liquid dispenser apparatus comprises the above-mentioned flushing conduit as well as the first base liquid storage and/or the second base liquid storage, according to a preferred embodiment, the flushing conduit may be fluidically connected to the first base liquid storage and/or the second base liquid storage and configured to receive the base liquid on its one end from the first base liquid storage and/or the second base liquid storage and to supply the base liquid to the additive storage receiving unit and/or the additive conduit via its other end. As a result, it is possible to flush the additive storage receiving unit and/or the additive conduit with cold and/or hot and/or boiling water for cleaning and/or sterilizing the additive storage receiving unit and/or the additive conduit.

It should be added, that the liquid dispenser apparatus may further comprise the liquid dispensing unit, the liquid dispensing unit preferably being a faucet, more preferably a pull-out faucet.

Furthermore, the liquid dispenser apparatus may further comprise a filter unit having a filter inlet fluidically connected to the liquid inlet and a filter outlet fluidically connected to the conduit arrangement, wherein the filter unit is configured to filter the base liquid received from the liquid source, wherein preferably the filter unit is arranged upstream the additive conduit and/or the first base liquid storage and/or the second base liquid storage.

A preferred embodiment of the present invention will now be described in more detail with respect to the accompanying drawings, in which.

Figure 4A:
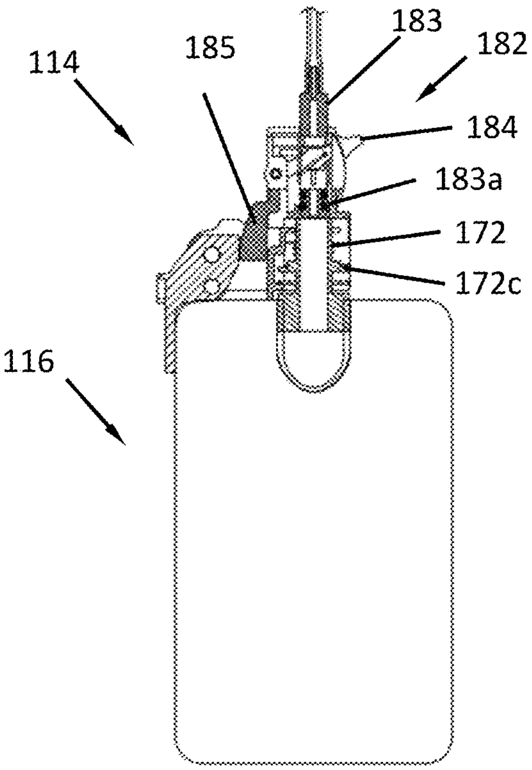
FIGS. 4A and 4B show a sliding unit which is intended to engage a respective additive storage.
Figure 4B:
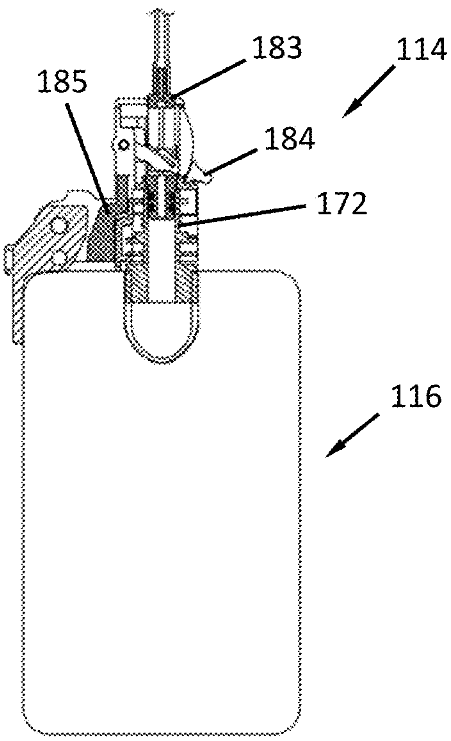
Figure 4C:
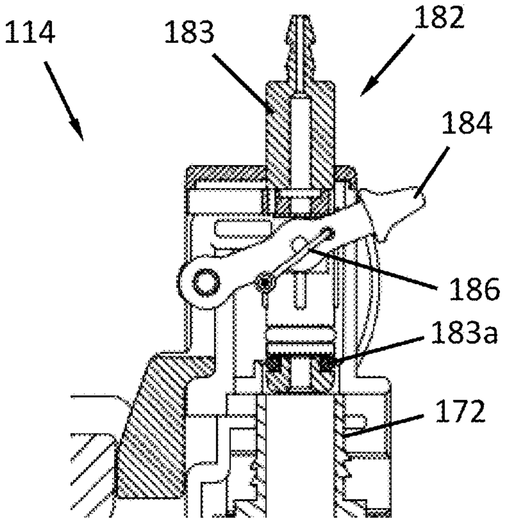
FIG. 4C shows a detailed view of FIG. 4A.
Figure 4D:
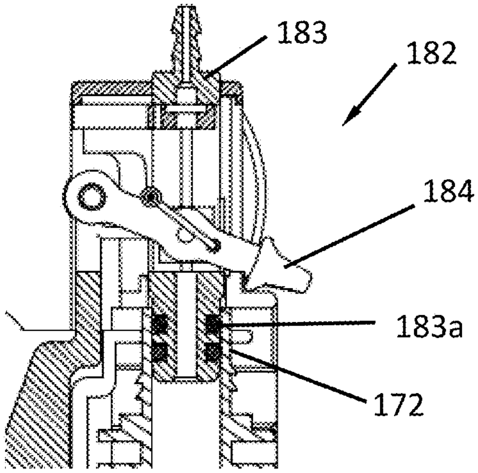
FIG. 4D shows a detailed view of FIG. 4B.
Figure 4E:
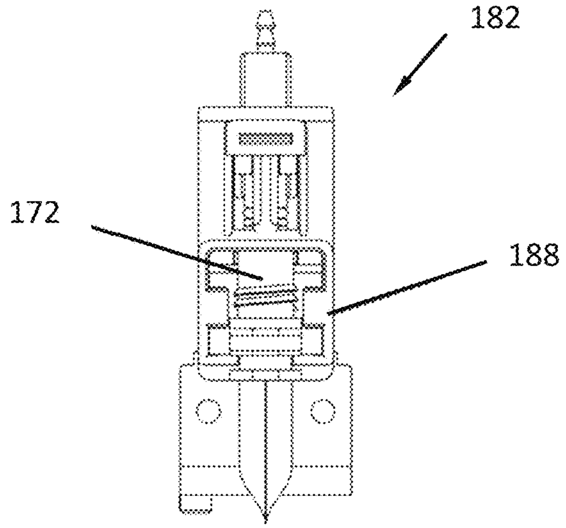
Figure 4F:
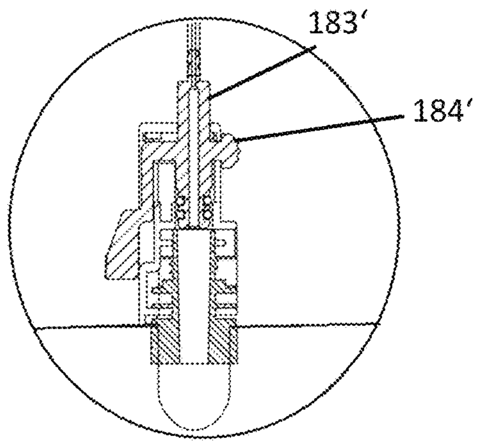
Figure 4G:
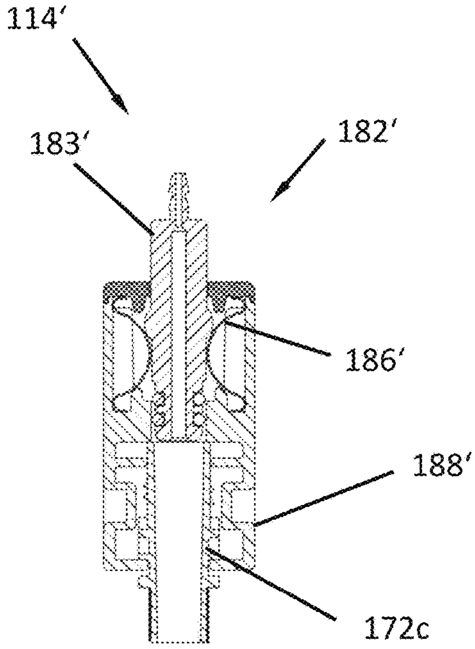
Figure 4H:
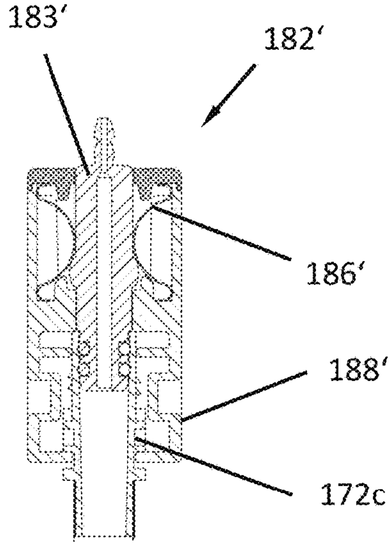
Figure 6:
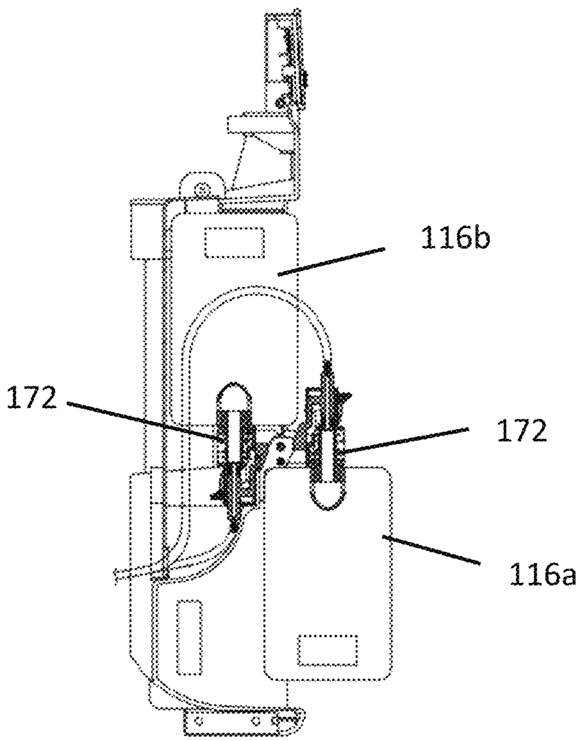
Figure 7A:
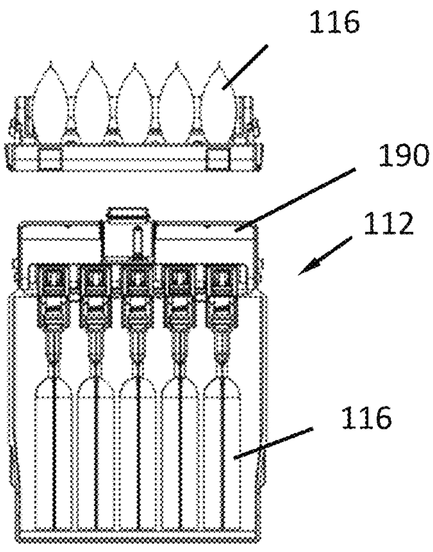
Figure 7B:
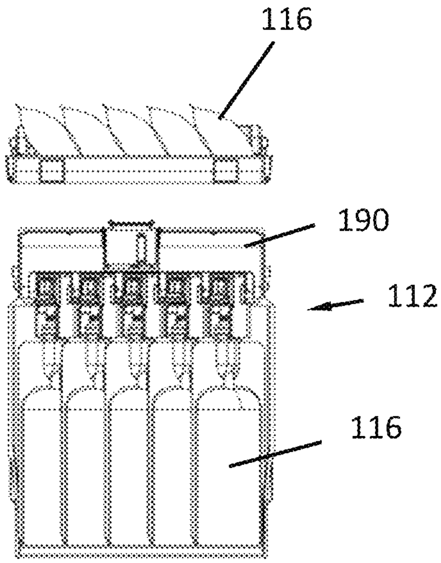
Figure 8A:
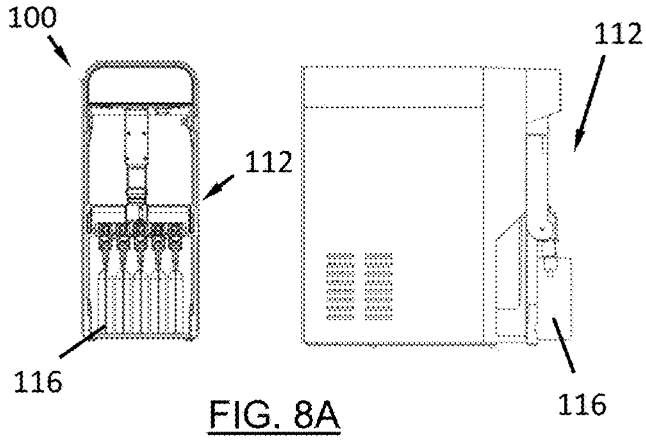
Figure 8B:
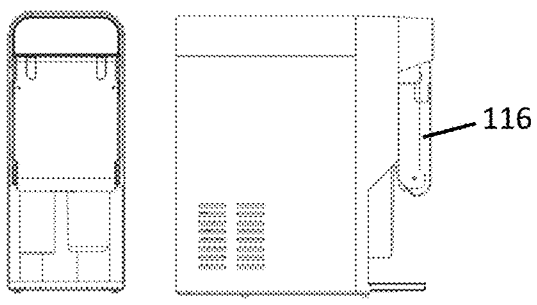
Figure 8C:
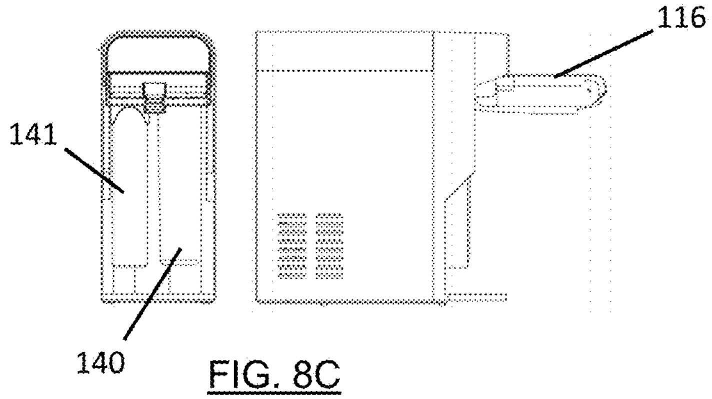
Figure 9:
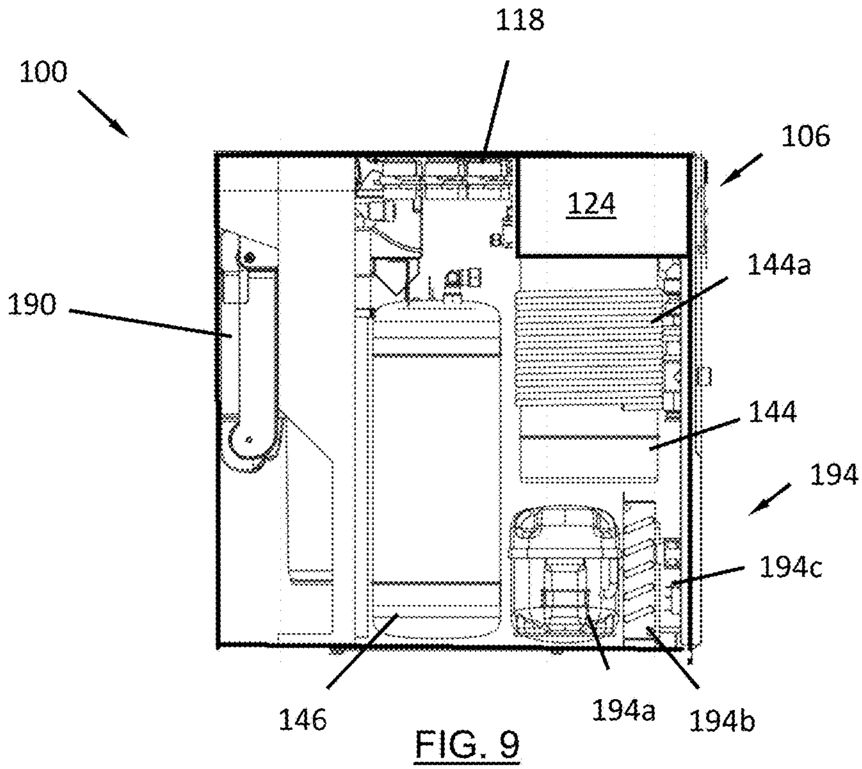

FIG. 4E a detailed view of FIG. 4A showing a receiving portion of a receiving slot;

FIGS. 4F to 4H a detailed view of another embodiment of the sliding unit having a push button instead of a sliding unit lever;

FIGS. 5A to 5D show a pivoting movement of the additive storage receiving unit;

FIG. 6 shows two additive storages loaded in the additive storage receiving unit in different positions, FIGS. 7A and 7B respectively, show a plurality of additive storages loaded in the additive storage receiving unit;

FIGS. 8A to 8C respectively, show a front view and a side view of the liquid dispenser apparatus with a magazine of the additive storage receiving unit in different positions; and FIG. 9 shows a more detailed example of the liquid dispenser apparatus shown in FIGS. 8A to 8C.

In FIG. 1, a liquid dispenser apparatus according to an embodiment of the present invention is generally designated by reference sign 100.

Figure 1A:
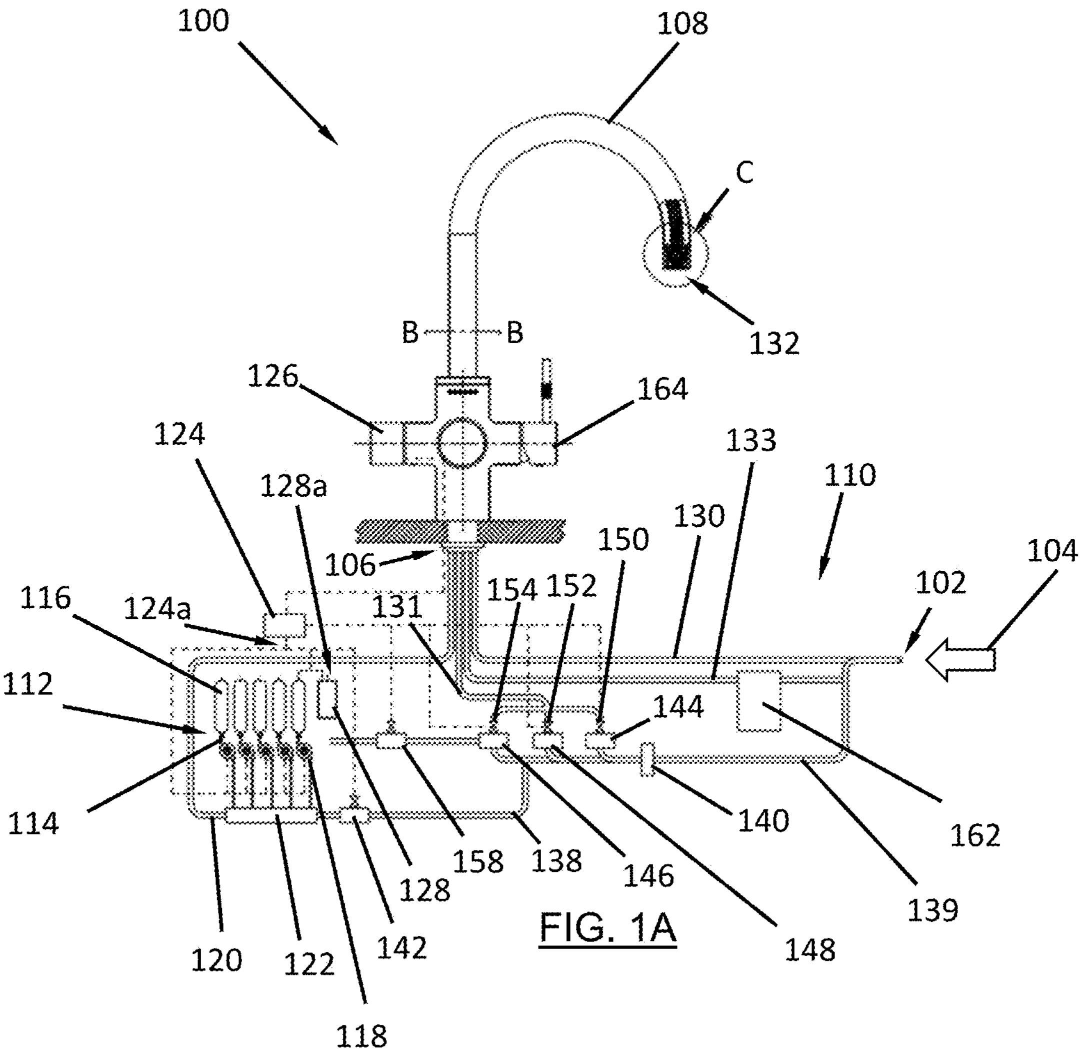
FIG. 1A is a schematic view of a liquid dispenser apparatus according to an embodiment of the present invention.

The liquid dispenser apparatus 100 comprises a liquid inlet 102 which is designed and intended to be connected to a liquid source 104, such as a mains water supply, which is indicated by an arrow in FIG. 1A. Furthermore, the liquid dispenser apparatus 100 comprises a dispensing outlet 106 which is designed and intended to be connected to a liquid dispensing unit 108 which, in the present embodiment, is formed as a faucet.

For putting the liquid inlet 102 and the dispensing outlet 106 into fluid communication with each other, the liquid dispenser apparatus 100 further comprises a conduit arrangement 110, which comprises a plurality of liquid conduits, for example.

In addition, the liquid dispenser apparatus 100 comprises an additive storage receiving unit 112 having a plurality of additive storage receiving slots 114. Each additive receiving slot 114 is configured to receive an additive storage 116 configured to contain an additive liquid, such as a flavored syrup and/or additives for hot water, such as tea and/or coffee, and/or health additives, such as vitamins and/or minerals, or the like, and to dispense the additive liquid into the conduit arrangement 110.

In the present embodiment, each additive receiving slot 114 is associated with a pump unit 118, which may be formed as a bidirectional pump unit for pumping liquid into an additive conduit 120 of the conduit arrangement 110 and sucking additive liquid out of the additive conduit 120 into a respective additive storage 116. The additive storages 116 as well as the respective additive storage receiving slots 114 may be connected to the additive conduit 120 via a manifold 122.

Figure 3:
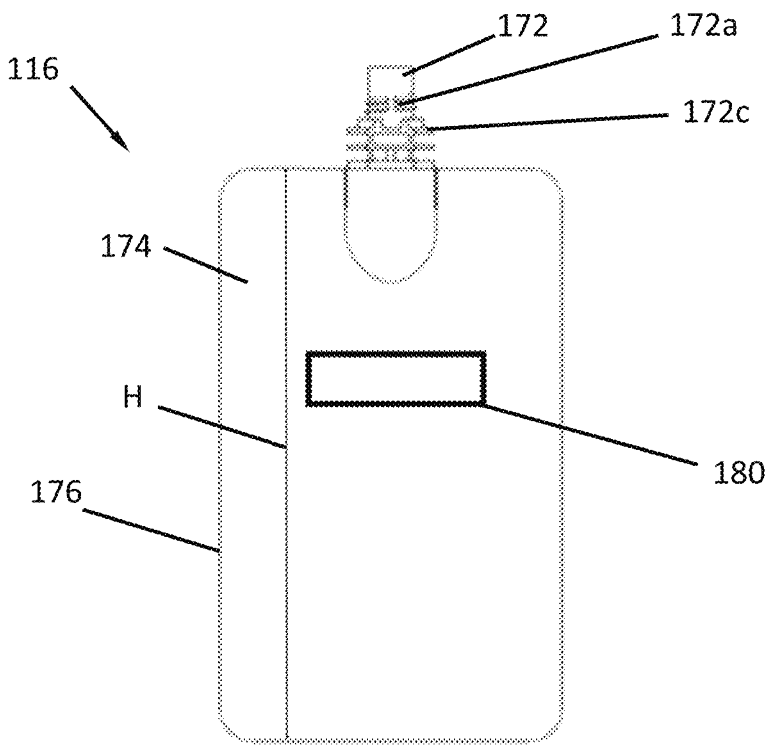
FIG. 3 shows an example of an additive storage of the liquid dispenser apparatus.

The liquid dispenser apparatus 100 further comprises a control unit 124, which is operatively connected to the pump units 118 for operating the pump units 118 in both directions. In addition, the control unit 124 is also operatively connected to a user interface 126 which, in the present embodiment, is integrated in the faucet 108. The user interface 126 may be operated by a user to receive an additive liquid selection command corresponding to a predetermined additive liquid. Therefore, the control unit 124 comprises a memory, such as a read-write memory, which is configured to store a respective additive storage identifier 180 (as shown in FIG. 3, for example) for each additive storage receiving slot 114 to associate each predetermined content of additive liquid with a respective additive storage receiving slot 114. Thus, based on the additive liquid selection command, the control unit 124 is configured to control the additive storage receiving unit 112 to select the correct additive storage receiving slot 118 and to put the respective additive storage 116 in fluid communication with the conduit arrangement 110, i.e. the additive conduit 120. This is possible, as the control unit 124 knows which additive storage 116 and thus, which predetermined content of additive liquid corresponding to a predetermined flavored syrup, for example, is received in which additive storage receiving slot 114.

Furthermore, the user interface 126 may be operated by a user for dispensing the base liquid, such as filtered cold or hot water, and/or the additive liquid and/or the base liquid and the additive liquid at substantially the same time for producing a mixture of the latter, via the liquid dispensing unit 108.

To make the process of associating each additive storage receiving slot 114 with a respective additive storage 116 particularly comfortable for a user, according to the present embodiment, the liquid dispenser apparatus 100 further comprises a detecting unit 128 having at least one signal output 128*a* which is connected to a corresponding signal input 124*a* of the control unit 124. The detecting unit 128 may be formed as an optical reader, such as a barcode and/or QR-code reader and/or a camera and/or a magnetic reader, in particular an RFID reader. Thus, the detection unit 128 may be configured to automatically detect an additive storage identifier 180 of a respective additive storage 116 when inserting the additive storages 116 in a respective additive storage receiving slot 114. For this reason, each additive storage 116 comprises the additive storage identifier 180, which may be formed as a barcode and/or a QR-code and/or a label, such as a label 180 shown in FIG. 3, which may be printed or fixed to an outer surface of the respective additive storage 116. To be able to detect which additive storage 116 is received in which additive storage receiving slot 114, after the additive storages 116 have been inserted into the respective additive storage receiving slots 114, the detecting unit 128, according to the present embodiment, is arranged adjacent to the additive storage receiving unit 112. As an alternative, however, the detecting unit may also be configured as a mobile detecting unit, such as a mobile terminal in form of a smartphone or a smartwatch, if it is preferred to detect the additive storage identifier 180 of a respective additive storage 116, in form of additive storage identifier data, for example, prior to inserting the additive storages 116 into the additive storage receiving slots 114. The detected additive storage identifier data may be transferred to the control unit 124 wireless or manually and/or the storage receiving slot 114 may be inserted manually via the mobile terminal or via the, preferably touch screen, user interface 126.

For inputting the additive liquid selection command, the user interface 126 may be formed as a touch screen, for example. Via a touch screen, it is also possible to display predetermined information to the user, such as the selection of available flavors corresponding to the predetermined contents of liquid additives contained in the additive storages 116 loaded in the additive storage receiving unit 112.

As already mentioned above, the liquid dispenser apparatus 100 is configured to receive the base liquid, such as water, from the liquid source 104 via the liquid inlet 102. From the liquid inlet 102, the base liquid may be supplied as non-filtered and non-heated liquid, such as cold line water, through a conduit 130 and/or as non-filtered and heated liquid which has been heated by a heating device 162 through a conduit 133 to the dispensing outlet 106 and thus, to the faucet 108.

In addition, from the liquid inlet 102, the base liquid may be introduced in conduit 139, filtered by a filter unit 140 and supplied as filtered base liquid via base liquid storages 144,

146 and 148 (which are described in more detail below) through a conduit 131 to the dispensing outlet 106 and thus, to the faucet 108.

Figure 1B:
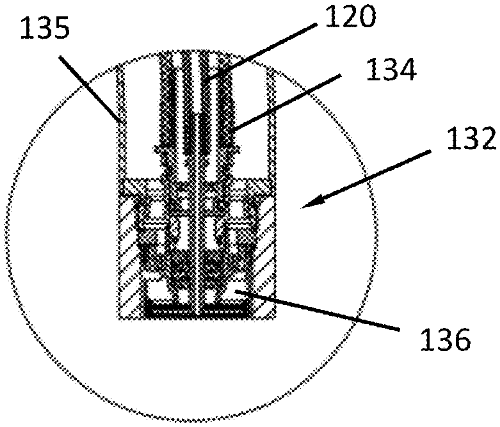
FIG. 1B is a section view of a detail C of FIG. 1A.
Figure 1C:
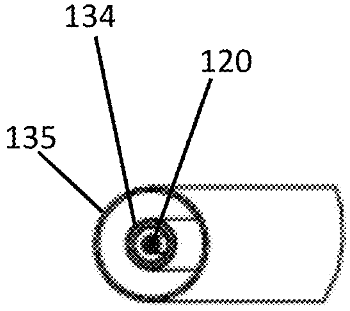
FIG. 1C is a section view taken along line B-B in FIG. 1A.

In a similar manner, the additive liquid contained in an additive storage 116 that has been selected by the user may be supplied by a respective pump unit of the pump units 118 through the additive conduit 120 to the dispensing outlet 106 and thus, also to the faucet 108. In this context, to ensure mixing of the base liquid supplied by the liquid source 104, in particular of filtered base liquid supplied via conduit 131, and the additive liquid preferably only at an outlet 132 of the faucet 108, the additive conduit 120 is fluidically separated from other conduits of the conduit arrangement 110, such as a first base liquid conduit 134 for filtered liquid (as shown in FIGS. 1B and 1C) for dispensing the base liquid at the outlet 132 of the faucet 108. As also shown in FIGS. 1B and 1C the outlet 132 may also comprise a second base liquid conduit 135 for non-filtered liquid which is supplied via conduit 130 and/or conduit 133 to the dispensing outlet 106 and which is mixed by a mixing device 164 (which is described below). The additive conduit 120, the first base liquid conduit 134 for filtered liquid and the second base liquid conduit 135 for non-filtered liquid may be formed in a concentric arrangement, as shown in FIG. 1C, for example. The outlet 132, which may be formed as a spout of the faucet 108, may further comprise an aerator 136 for mixing liquid dispensed through the outlet 132 with air.

As further shown in FIG. 1A, the conduit arrangement 110 may further comprise a flushing conduit 138, which is configured to receive the base liquid supplied from the liquid source 104, which has been filtered via the filter unit 140, and to supply such filtered base liquid to the additive conduit 120 for flushing the additive conduit 120 to remove residuals of additive liquid or the like. The flow of base liquid supplied from the flushing conduit 138 to the additive conduit 120 may be controlled by operating, i.e. opening or closing, a solenoid valve 142 that is operatively connected to the control unit 124.

With further reference to FIG. 1A, the liquid dispenser apparatus 100 further comprises a first base liquid storage 144, a second base liquid storage 146 as well as a third liquid storage 148. In the present embodiment, the first base liquid storage 144 may be configured to store a first base liquid such as cold and/or carbonized water. The second base liquid storage 146 may be configured to store a second base liquid, such as hot and/or boiling water. Therefore, the first base liquid storage 144 may further comprise a corresponding cooling device (not shown) and/or the second base liquid storage 146 may comprise a corresponding heating device (not shown). The third liquid storage 148 may be configured to store a liquid other than the first and second liquid storages 144 and 148, such as cold and non-carbonized water or the like. The liquid stored in the first, second and third liquid storages 144, 146 and 148 may be dispensed via corresponding operating solenoid valves 150, 154 and 152 into the conduit arrangement 110 to be supplied to and dispensed via the faucet 108. The solenoid valves 150, 154 and 152 may also be operatively connected to the control unit 124 to be controlled via the control unit 124.

Figure 1D:
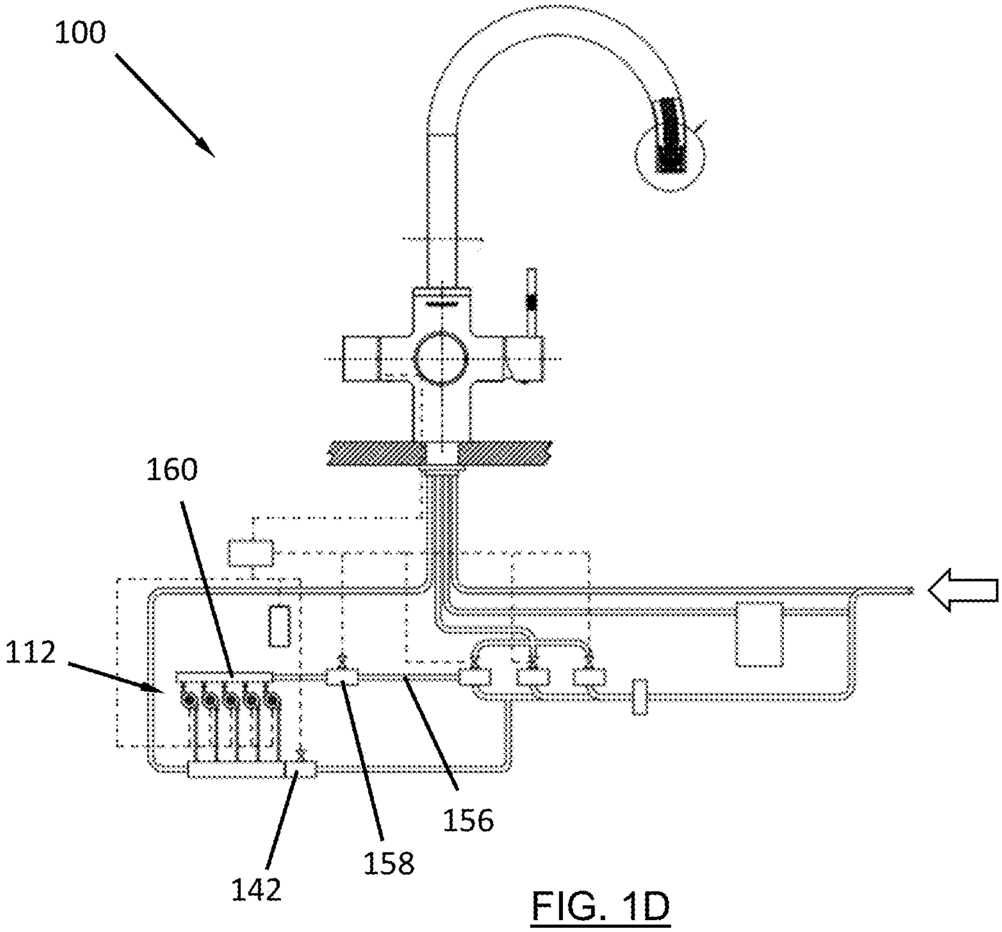
FIG. 1D is a schematic view which corresponds to FIG. 1A except for additive storages being removed from an additive storage receiving unit of the liquid dispenser apparatus, and wherein pump units are connected to a further flushing conduit with a manifold.

As shown in FIG. 1D, for example, the liquid dispenser apparatus 100 may also comprise a further flushing conduit 156, for performing sterilization, for example, which is fluidically connected to the additive storage receiving unit 112. Thus, by operating a further solenoid valve 158, which is also operatively connected to the control unit 124, liquid, such as hot or boiling water, may be supplied from the second liquid storage 146 through the further flushing conduit 156 to the additive storage receiving slots 114 via a manifold 160 to clean and/or sterilize the additive storage receiving unit 112, in particular the additive storage receiving slots 114, and/or the additive conduit 120.

It should be added that the liquid dispenser apparatus 100, as shown in FIG. 1A, for example, may further comprise a heating device 162, such as water heater or a boiler, for heating liquid supplied by the liquid source 104 and supplying it to the faucet 108 via conduit 133 of the conduit arrangement 110. The liquid heated by the heating device 162 may be supplied via conduit 133 to a mixing device 164 of the faucet 108 to be able to adapt a mixing ratio between the liquid heated by the heating device 162 and non-heated liquid, such as cold line water, supplied from the liquid source 104 via conduit 130 which mixing ratio is to be dispensed via the faucet 108.

Figure 2:
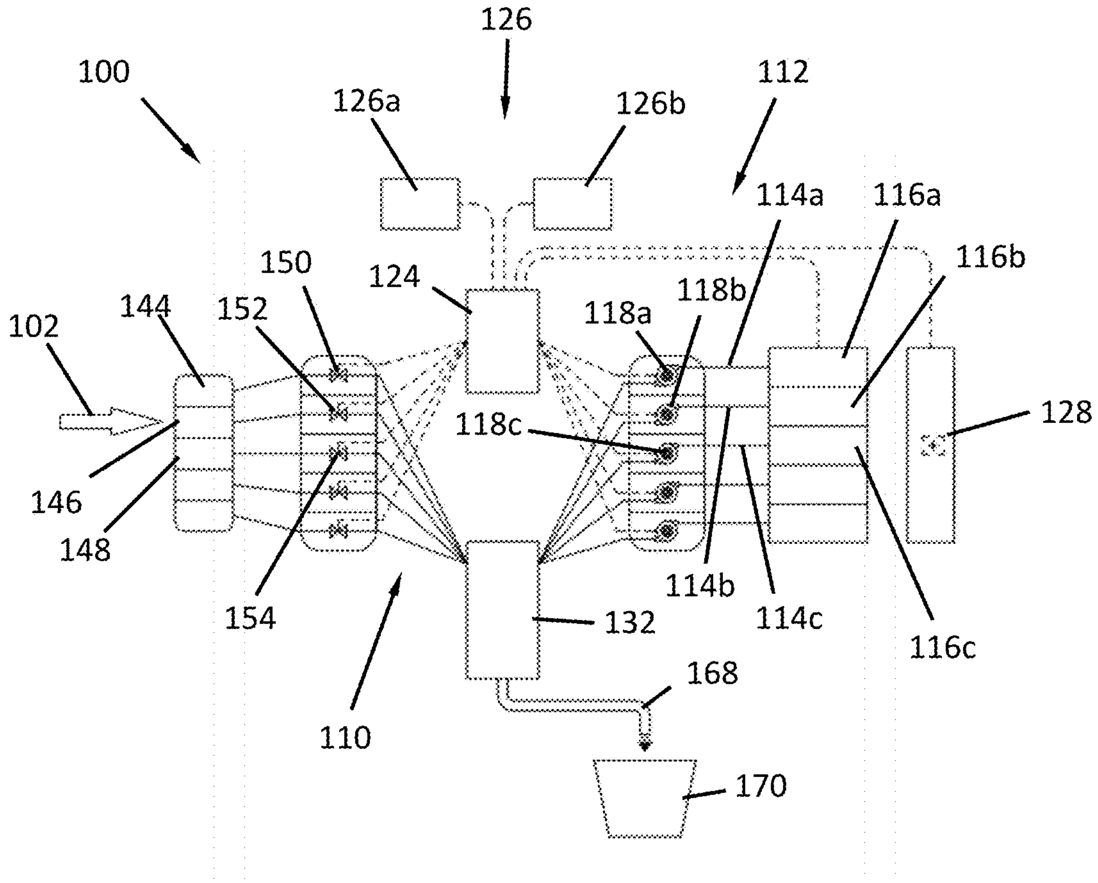
FIG. 2 is a schematic view showing a functional arrangement of the liquid dispenser apparatus.

FIG. 2 shows a schematic view showing a functional arrangement, in particular of base liquid storages and additive liquid storages, of the liquid dispenser apparatus 100. The base liquid storages 144, 146 and 148 may be configured to receive liquid, respectively, such as water filtered by the filter unit 140 (shown in FIG. 1A) via the liquid inlet 102. As shown in FIG. 2, the liquid dispenser apparatus 100 may also comprise more than three base liquid storages, for example five base liquid storages, as indicated in FIG. 2. In addition, the liquid dispenser apparatus 100 may comprise the liquid storage receiving unit 112 configured to receive additive storages 116*a*, 116*b* and 116*c*, for example. As for the base liquid storages, the liquid storage receiving unit may be configured to receive more than three additive storages, as shown in FIG. 2, for example. The flow of liquid from the base liquid storages 144, 146 and 148 to the outlet 132 of the faucet may be controlled by the solenoid valves 150, 154 and 152, which are therefore operatively connected to the control unit 124. The flow of additive liquid to the outlet 132 may be, in turn, controlled by operating pumps 118*a*, 118*b* and 118*c*, which are likewise operatively connected to the control unit 124. The control unit 124 may be operatively connected to the user interface 126, which may comprise an input portion 126*a* for receiving the additive liquid selection command, for example, and an output portion 126*b* for displaying information to the user of the liquid dispenser apparatus 100, for example. To detect which additive storage 116 is received in which additive storage receiving slot of additive storage receiving slots 114*a*, 114*b* and 114*c*, the liquid dispenser apparatus 100 further comprises the detection unit 128, which may be formed as an optical and/or magnetic detection unit as explained above.

At the outlet 132, a mixture of base liquid and additive liquid may be dispensed via a spout 168 of the liquid dispensing unit in a receiving vessel 170.

FIG. 3 shows a particular example of an additive storage 116. The additive storage 116 may comprise an additive storage spout 172 with a thread 172*a* for holding a cap (not shown) for closing the additive storage 116 before loading the additive storage 116 to keep the additive safe within the additive storage 116. A shoulder 172*c* on the additive storage spout 172 is to be engaged with a respective additive storage receiving slot 114 of the additive storage receiving unit 112. The additive storage 116 may be formed as a semi-flexible pouch having flexible pouch walls 174, for example. However, an outer structure 176 of the additive storage 116 may be formed as a dimensionally stable structure that is configured to remain straight so that a height H of the additive storage 116 is substantially constant irrespective of a fill level of the additive storage 116. As mentioned above, according to the present embodiment, the additive storage 116 further comprises the additive storage identifier in form of the label 180.

As shown in FIGS. 4A to 4E, the additive storage receiving slots 114 may comprise a sliding unit 182 which, according to the present embodiment, is linearly translatable between a first position (shown in FIG. 4A) and a second position (shown in FIG. 4B). In the first position, the additive storage 116 is insertable into and/or removable from the additive storage receiving slot 114, while in the second position, the sliding unit 182 is configured to engage the additive storage spout 172 of the additive storage 116. To translate the sliding unit 182 from the first position into the second position and vice versa, the sliding unit 182 comprises a sliding unit lever 184 that may be manually operated by the user of the liquid dispenser apparatus 100. With the sliding unit lever 184 in the second position shown in FIG. 4B, the additive storage 116 is connected to the respective additive storage receiving slot 114 in a fluid-tight manner. The fluid-tight connection is established by a linear movement of a slider 183 of the sliding unit 182 that may be moved in response to operating the sliding unit lever 184. To improve the fluid-tight connection between the additive storage spout 172 and the slider 183, the sliding unit 182 may further comprise an O-ring arrangement 183*a*. To hold the slider 183 in position, the sliding unit 182 may also comprise a spring arrangement 186, as shown in FIG. 4C, for example. In addition, each receiving slot 114 may further comprise a receiving portion 188 formed to receive the spout 172 of the storage and hold it in a fixed position to ensure smooth entry of the slider 183 into the additive storage spout 172. The shoulder 172*c* is configured to keep the additive storage spout 172 in the right place.

Figure 5A:
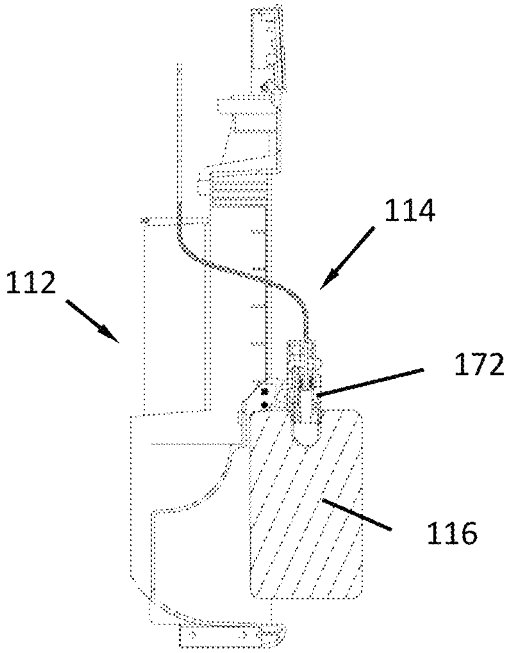
Figure 5B:
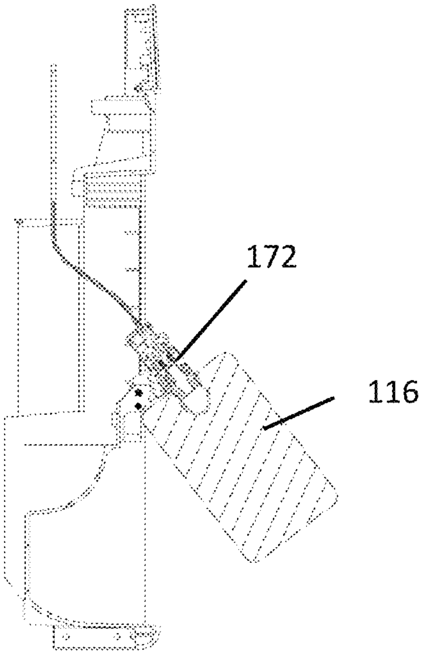
Figure 5C:
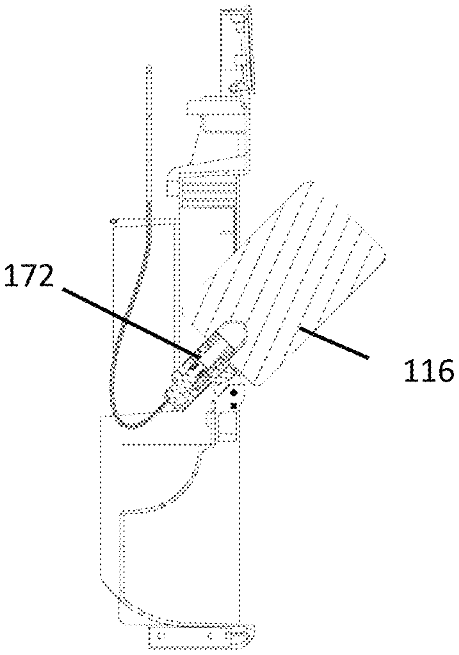
Figure 5D:
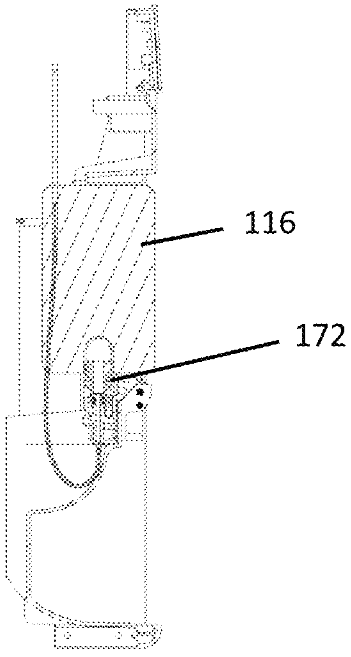

FIGS. 4F to 4H show detailed views of another embodiment of the sliding unit 182' with a push button 184' instead of a sliding unit lever. By operating the push button 184' in a substantially vertical direction the slider 183' may be moved between the positions shown in FIGS. 4G and 4H. For holding the slider 183' in position, the sliding unit 182' may also comprise a spring arrangement 186', as shown in FIGS. 4G and 4H, for example. Furthermore, each receiving slot 114' may also comprise a receiving portion 188' substantially corresponding to receiving portion 188. As shown in FIGS. 5A to 5D, the additive storage receiving unit 112 may be configured to be movable by a pivoting movement between a maintenance position (shown in FIG. 5A), in which the additive storages 116 are insertable into and/or removable from the respective additive storage receiving slot 114, wherein in the maintenance position, the spouts 172 of the additive storages 116 face in an substantially upward direction, and an operating position (shown in FIG. 5D) in which the additive storage receiving unit 112 along with the additive storages 116 are pivoted such that the spouts 172 of the additive storages 116 face in a substantially downward direction. FIGS. 5B and 5C show intermediate positions between the positions shown in FIG. 5A and FIG. 5D.

To ensure that the additive storage receiving unit 112 may be pivoted into the operating position only after the sliding unit 182 has been engaged with the spout 172 of the respective additive storage 116 in a fluid tight manner, the additive storage receiving unit 112 may be configured such that the pivoting movement from the maintenance position into the operating position is prevented, if the sliding unit 182 is in the first position shown in FIG. 4A. This may be realized by means of a locking element 185 that is operatively connected to the sliding unit lever 184 and may be moved between a locking position shown in FIG. 4A and a releasing position shown in FIG. 4B.

In FIG. 6, it is shown one additive storage 116*a* which is in the maintenance position as well as a further additive storage 116*b* which is in the operating position. Thus, it may be also possible to pivot the additive storages 116*a* and 116*b* separately from each other.

FIGS. 7A and 7B show a front view and a side view of the additive storages 116 arranged in a magazine 190 of the additive storage receiving unit 112. As shown in FIG. 7A, after loading the additive storages 116 into the additive storage receiving slots 114, the additive storages are straight with a gap between them for easy loading/unloading into or from the respective receiving slot 114, while in FIG. 7B, the additive storages 116 are tilted to close the gap between the additive storages 116 for saving mounting space, when the additive storage receiving unit 112 magazine 190 is in an operating position in the liquid dispenser apparatus.

FIGS. 8A to 8C show the magazine 190 of the additive storage receiving unit 112 in different positions, wherein in FIG. 8A, the magazine 190 is in its loading position, in which additive storages 116 may be inserted in each additive storage receiving slot 114, while in FIG. 8B, the magazine 190 is in an inverted position as compared to FIG. 8A, in which the magazine 190 is ready for use. In FIG. 8C, the magazine 190 is in an intermediate position in which other components of the liquid dispenser apparatus 100, such as the filter unit 140 or a $CO_2$ container 141 may be accessible for service reasons.

As shown in FIG. 9, the liquid dispenser apparatus 100 may comprise the first liquid storage 144 including a cooling coil 144A as a cooling device as well as a second liquid storage 146 for storing hot and/or boiling liquid. In addition, the liquid dispenser apparatus 100 may comprise a cooling system 194 including a compressor 194*a*, a condenser 194*b* and a fan 194*c*.

A collection of exemplary embodiments are provided below, including at least some explicitly enumerated as “Illustrations” providing additional description of a variety of example embodiments in accordance with the concepts described herein. These illustrations are not meant to be mutually exclusive, exhaustive, or restrictive; and the disclosure not limited to these example illustrations but rather encompasses all possible modifications and variations within the scope of the issued claims and their equivalents.

Illustration 1. Liquid dispenser apparatus (100), comprising a liquid inlet (102) which is designed and intended to be connected to a liquid source (104) and to receive a base liquid from the liquid source (104), a dispensing outlet (106) which is designed and intended to be connected to a liquid dispensing unit (108), in particular a faucet, a conduit arrangement (110) which is configured to put at least the liquid inlet (102) and the dispensing outlet (106) into fluid communication with each other, an additive storage receiving unit (112) having a plurality of additive storage receiving slots (114), wherein each additive storage receiving slot (114) is designed and intended to receive an additive storage (116) configured to contain an additive liquid and to dispense the additive liquid into the conduit arrangement (110), each additive storage (116) having an additive storage identifier (180) for identifying a predetermined content of additive liquid contained in the respective additive storage (116), a control unit (124) which is operatively connected to the additive storage receiving unit (112), the control unit (124) having a memory which is configured to store a respective additive storage identifier (180) for each additive storage receiving slot (114) to associate each predetermined content of additive liquid with a respective additive storage receiving slot (114), and a user interface (126) which is operatively connected to the control unit (124) and configured to be operated by a user, wherein the user interface (124) is configured to receive an additive liquid selection command by the user corresponding to a respective predetermined content of additive liquid, wherein, based on the additive liquid selection command, the control unit (124) is configured to control the additive storage receiving unit (112) to select a respective additive storage receiving slot (114) and to put the respective additive storage (116) in fluid communication with the conduit arrangement (110).

Illustration 2. Liquid dispenser apparatus according to Illustration 1, wherein the user interface (126) is configured to receive additive storage identifier data which are to be manually input by a user, the additive storage identifier data indicating a respective additive storage (116), in particular a respective predetermined content of additive liquid, which is received in a corresponding additive storage receiving slot (116), and to receive additive storage receiving slot data which are to be manually input by a user, the additive storage receiving slot data indicating the corresponding additive storage receiving slot (114) in which the respective additive storage (116) is received, and/or further comprising a detecting unit (128) having at least one signal output (128*a*) which is connected to a signal input (124*a*) of the control unit (124) and configured to, in particular automatically, detect the additive storage identifier (180) of a respective additive storage (116) and/or the additive storage receiving slot (114) in which the respective additive storage (116) is received or is intended to be received.

Illustration 3. Liquid dispenser apparatus according to Illustration 2, wherein the detecting unit (128) comprises an optical reader, in particular a barcode reader and/or a camera, and/or a magnetic reader, in particular a RFID reader, and/or wherein the additive storage identifier (180) comprises an optical identifier, in particular a barcode and/or a QR-code and/or a label, and/or a magnetic identifier, in particular a RFID identifier.

Illustration 4. Liquid dispenser apparatus according to Illustration 2 or 3, wherein the detecting unit (128) is configured to be arranged on or adjacent to the additive storage receiving unit (112), or is configured as a mobile detecting unit, in particular a mobile terminal, such as smartphone or a smartwatch.

Illustration 5. Liquid dispenser apparatus according to any of the preceding Illustrations, wherein the user interface (126) comprises an electronic knob and/or a touch panel and/or a touch screen, which is preferably arranged on or adjacent to the liquid dispensing unit (108), and/or wherein the user interface (126) is configured to be operated by a user for dispensing the base liquid and/or the additive liquid and/or the base liquid and the additive liquid at substantially the same time via the liquid dispensing unit (108).

Illustration 6. Liquid dispenser apparatus according to any of the preceding Illustrations, wherein the additive storage receiving unit (112) is configured to dispense the additive liquid into an additive conduit (120) of the conduit arrangement (110) which is fluidically connected to the liquid dispensing unit (108), wherein preferably the additive conduit (120) is fluidically separated from other conduits of the conduit arrangement (110) which are directly connected to the liquid dispensing unit (108).

Illustration 7. Liquid dispenser apparatus according to any of the preceding Illustrations, wherein the conduit arrangement (110) further comprises a flushing conduit (138, 156) which is configured to receive the base liquid on its one end and to supply the base liquid to the additive storage receiving unit (112) and/or the additive conduit (120) via its other end.

Illustration 8. Liquid dispenser apparatus according to any of the preceding Illustrations, further comprising at least one pump unit (118, 118*a*, 118*b*, 118*c*), in particular at least one pump (118, 118*a*, 118*b*, 118*c*) unit for each additive receiving slot (114, 114*a*, 114*b*, 114*c*), wherein the at least one pump unit (118, 118*a*, 118*b*, 118*c*) is configured to be fluidically connected to a respective additive storage (116) to dispense the additive liquid into the conduit arrangement (110), in particular the additive conduit (120).

Illustration 9. Liquid dispenser apparatus according to Illustration 8, wherein the at least one pump unit (118, 118*a*, 118*b*, 118*c*) is configured as a bidirectional pump unit, which is configured to be operated in a pump mode in which it is configured to pump additive liquid into the conduit arrangement (110), in particular the additive conduit (120), and a suction mode in which it is configured to draw additive liquid out of the conduit arrangement (110), in particular the additive conduit (120).

Illustration 10. Liquid dispenser apparatus according to any of the preceding Illustrations, wherein each additive storage (116) is formed as a flexible additive storage, or a semi-flexible additive storage (116), in particular as a pouch having a self-supporting and dimensionally stable structure (176) with flexible collapsible pouch walls (174), or as an additive storage having a substantially box-shaped rigid outer structure with a pouch having flexible collapsible pouch walls received in the substantially box-shaped rigid outer structure.

Illustration 11. Liquid dispenser apparatus according to any of the preceding Illustrations, wherein at least one, in particular each, additive storage receiving slot (114) of the plurality of additive storage receiving slots (114) comprises a sliding unit (182, 182') which is configured to be, preferably linearly, translatable between a first position, in which an additive storage (116) is insertable into and/or removable from the respective additive storage receiving slot (114), and a second position in which the sliding unit (182, 182') is configured to engage a spout (172) of the respective additive storage (116) in a fluid tight manner.

Illustration 12. Liquid dispenser apparatus according to any of the preceding Illustrations, wherein the additive storage receiving unit (112) is configured to be movable by a pivoting movement between a maintenance position in which the additive storages (116) are insertable into and/or removable from the respective additive storage receiving slot (114) with spouts (172) of the additive storages (116) facing in an substantially upward direction, and an operating position in which the additive storage receiving unit (112) along with the additive storages (116) are pivoted such that the spouts (172) of the additive storages (116) face in a substantially downward direction, or wherein the additive storages (116) are configured to be inserted into and/or removed from the respective additive storage receiving slot (114) with the spouts (172) of the additive storages (116) facing in a substantially downward direction.

Illustration 13. Liquid dispenser apparatus according to Illustrations 11 and 12, wherein the additive storage receiving unit (112) is configured such that the pivoting movement from the maintenance position into the operating position is prevented, if the sliding unit (184) is in the first position.

Illustration 14. Liquid dispenser apparatus according to any of the preceding Illustrations, further comprising at least one first base liquid storage (144) configured to store a first base liquid, in particular cold and/or carbonized water, and/or at least one second base liquid (146) storage configured to store a second base liquid, in particular hot and/or boiling water, wherein the first (144) and/or the second (146) liquid storage is fluidically connected to the conduit arrangement (110).

Illustration 15. Liquid dispenser apparatus according to Illustrations 7 and 14, and optionally any of Illustrations 2 to 6 and 8 to 13, wherein the flushing conduit (138, 156) is fluidically connected to the first base liquid storage (144) and/or the second base liquid storage (146) and/or to the filter unit (140) and configured to receive the base liquid on its one end from the first base liquid storage (144) and/or the second base liquid storage (146) and to supply the base liquid to the additive storage receiving unit (112) and/or the additive conduit (120) via its other end.

The invention claimed is:

1. Liquid dispenser apparatus, comprising:

a liquid inlet which is designed and intended to be connected to a liquid source and to receive a base liquid from the liquid source;

a dispensing outlet which is designed and intended to be connected to a liquid dispensing unit;

a conduit arrangement which is configured to put at least the liquid inlet and the dispensing outlet into fluid communication with each other;

an additive storage receiving unit having a plurality of additive storage receiving slots, wherein each additive storage receiving slot is designed and intended to receive an additive storage configured to contain an additive liquid and to dispense the additive liquid into the conduit arrangement, each additive storage having an additive storage identifier for identifying a predetermined content of additive liquid contained in the respective additive storage;

at least one pump unit configured to be fluidically connected to a respective additive storage to dispense the additive liquid into the conduit arrangement, wherein the at least one pump unit is configured as a bidirectional pump unit, which is configured to be operated in a pump mode in which it is configured to pump additive liquid into the conduit arrangement, and a suction mode in which it is configured to draw additive liquid out of the conduit arrangement;

a control unit which is operatively connected to the additive storage receiving unit, the control unit having a memory which is configured to store a respective additive storage identifier for each additive storage receiving slot to associate each predetermined content of additive liquid with a respective additive storage receiving slot; and a user interface which is operatively connected to the control unit and configured to be operated by a user, wherein the user interface is configured to receive an additive liquid selection command by the user corresponding to a respective predetermined content of additive liquid, wherein, based on the additive liquid selection command, the control unit is configured to control the additive storage receiving unit to select a respective additive storage receiving slot and to put the respective additive storage in fluid communication with the conduit arrangement.

2. Liquid dispenser apparatus according to claim 1, wherein the user interface is configured to receive additive storage identifier data which are to be manually input by a user, the additive storage identifier data indicating a respective additive storage, which is received in a corresponding additive storage receiving slot, and to receive additive storage receiving slot data which are to be manually input by a user, the additive storage receiving slot data indicating the corresponding additive storage receiving slot in which the respective additive storage is received, and/or further comprising a detecting unit having at least one signal output which is connected to a signal input of the control unit and configured to detect:

the additive storage identifier of a respective additive storage; and/or the additive storage receiving slot in which the respective additive storage is received or is intended to be received.

3. Liquid dispenser apparatus according to claim 2, wherein the detecting unit is configured to automatically detect:

the additive storage identifier of a respective additive storage; and/or the additive storage receiving slot in which the respective additive storage is received or is intended to be received.

4. Liquid dispenser apparatus according to claim 2, wherein the detecting unit comprises an optical reader and/or wherein the additive storage identifier comprises an optical identifier.

5. Liquid dispenser apparatus according to claim 2, wherein the detecting unit is configured to be arranged on or adjacent to the additive storage receiving unit, or is configured as a mobile detecting unit.

6. Liquid dispenser apparatus according to claim 1, wherein the user interface comprises an electronic knob and/or a touch panel and/or a touch screen, and/or wherein the user interface is configured to be operated by a user for dispensing the base liquid and/or the additive liquid and/or the base liquid and the additive liquid at substantially the same time via the liquid dispensing unit.

7. Liquid dispenser apparatus according to claim 1, wherein the additive storage receiving unit is configured to dispense the additive liquid into an additive conduit of the conduit arrangement which is fluidically connected to the liquid dispensing unit.

8. Liquid dispenser apparatus according to claim 7, wherein the conduit arrangement further comprises a flushing conduit which is configured to receive the base liquid on its one end and to supply the base liquid to the additive storage receiving unit and/or the additive conduit via its other end.

9. Liquid dispenser apparatus according to claim 1, wherein each additive storage is formed as:

a flexible additive storage; or a semi-flexible additive storage having a self-supporting and dimensionally stable structure with flexible collapsible pouch walls, or as an additive storage having a substantially box-shaped rigid outer structure with a pouch having flexible collapsible pouch walls received in the substantially box-shaped rigid outer structure.

10. Liquid dispenser apparatus according to claim 1, wherein the additive storage receiving unit is configured to be movable by a pivoting movement between a maintenance position in which the additive storages are insertable into and/or removable from the respective additive storage receiving slot with spouts of the additive storages facing in an substantially upward direction, and an operating position in which the additive storage receiving unit along with the additive storages are pivoted such that the spouts of the additive storages face in a substantially downward direction, or wherein the additive storages are configured to be inserted into and/or removed from the respective additive storage receiving slot with the spouts of the additive storages facing in a substantially downward direction.

11. Liquid dispenser apparatus, comprising:

a liquid inlet which is designed and intended to be connected to a liquid source and to receive a base liquid from the liquid source;

a dispensing outlet which is designed and intended to be connected to a liquid dispensing unit;

a conduit arrangement which is configured to put at least the liquid inlet and the dispensing outlet into fluid communication with each other;

an additive storage receiving unit having a plurality of additive storage receiving slots, wherein each additive storage receiving slot is designed and intended to receive an additive storage configured to contain an additive liquid and to dispense the additive liquid into the conduit arrangement, each additive storage having an additive storage identifier for identifying a predetermined content of additive liquid contained in the respective additive storage;

a control unit which is operatively connected to the additive storage receiving unit, the control unit having a memory which is configured to store a respective additive storage identifier for each additive storage receiving slot to associate each predetermined content of additive liquid with a respective additive storage receiving slot; and a user interface which is operatively connected to the control unit and configured to be operated by a user, wherein the user interface is configured to receive an additive liquid selection command by the user corresponding to a respective predetermined content of additive liquid, wherein, based on the additive liquid selection command, the control unit is configured to control the additive storage receiving unit to select a respective additive storage receiving slot and to put the respective additive storage in fluid communication with the conduit arrangement;

wherein at least one additive storage receiving slot of the plurality of additive storage receiving slots comprises a sliding unit which is configured to be translatable between a first position, in which an additive storage is insertable into and/or removable from the respective additive storage receiving slot, and a second position in which the sliding unit is configured to engage a spout of the respective additive storage in a fluid tight manner.

12. Liquid dispenser apparatus according to claim 11, wherein the additive storage receiving unit is configured such that a pivoting movement from a maintenance position into an operating position is prevented, if the sliding unit is in the first position.

13. Liquid dispenser apparatus, comprising:

a liquid inlet which is designed and intended to be connected to a liquid source and to receive a base liquid from the liquid source;

a dispensing outlet which is designed and intended to be connected to a liquid dispensing unit;

a conduit arrangement which is configured to put at least the liquid inlet and the dispensing outlet into fluid communication with each other;

at least one first base liquid storage configured to store a first base liquid;

at least one second base liquid storage configured to store a second base liquid, wherein the at least one first base liquid storage and the at least one second base liquid storage are fluidically connected to the conduit arrangement;

an additive storage receiving unit having a plurality of additive storage receiving slots, wherein each additive storage receiving slot is designed and intended to receive an additive storage configured to contain an additive liquid and to dispense the additive liquid into the conduit arrangement, each additive storage having an additive storage identifier for identifying a predetermined content of additive liquid contained in the respective additive storage;

a control unit which is operatively connected to the additive storage receiving unit, the control unit having a memory which is configured to store a respective additive storage identifier for each additive storage receiving slot to associate each predetermined content of additive liquid with a respective additive storage receiving slot; and a user interface which is operatively connected to the control unit and configured to be operated by a user, wherein the user interface is configured to receive an additive liquid selection command by the user corresponding to a respective predetermined content of additive liquid, wherein, based on the additive liquid selection command, the control unit is configured to control the additive storage receiving unit to select a respective additive storage receiving slot and to put the respective additive storage in fluid communication with the conduit arrangement.

14. Liquid dispenser apparatus according to claim 13 wherein the additive storage receiving unit is configured to dispense the additive liquid into an additive conduit of the conduit arrangement which is fluidically connected to the liquid dispensing unit, wherein the additive conduit is fluidically separated from other conduits of the conduit arrangement which are directly connected to the liquid dispensing unit, wherein the conduit arrangement further comprises a flushing conduit which is configured to receive the base liquid on its one end and to supply the base liquid to the additive storage receiving unit and/or the additive conduit via its other end, and wherein the flushing conduit is fluidically connected to the first base liquid storage and/or the second base liquid storage and/or to a filter unit and configured to receive the base liquid on its one end from the first base liquid storage and/or the second base liquid storage and to supply the base liquid to the additive storage receiving unit and/or the additive conduit via its other end.

* * * * *